United States Patent
Arteaga Larios et al.

(10) Patent No.: US 11,065,848 B2
(45) Date of Patent: Jul. 20, 2021

(54) MULTILAYER FILMS, AND ARTICLES MADE THEREFROM

(71) Applicants: Dow Quimica Mexicana S.A. de C.V., Mexico City (MX); Dow Global Technologies LLC, Midland, MI (US)

(72) Inventors: Fabricio Arteaga Larios, Sugarland, TX (US); Jacquelyn A. Degroot, Sugarland, TX (US); Vivek Kalihari, Missouri City, TX (US)

(73) Assignees: Dow Global Technologies LLC, Midland, MI (US); Dow Quimica Mexicana S.A. de C.V., Mexico City (MX)

(*) Notice: Subject to any disclaimer, the term of this patent is extended or adjusted under 35 U.S.C. 154(b) by 112 days.

(21) Appl. No.: 15/750,357

(22) PCT Filed: Aug. 30, 2016

(86) PCT No.: PCT/US2016/049354
§ 371 (c)(1),
(2) Date: Feb. 5, 2018

(87) PCT Pub. No.: WO2017/044342
PCT Pub. Date: Mar. 16, 2017

(65) Prior Publication Data
US 2018/0222162 A1  Aug. 9, 2018

Related U.S. Application Data

(60) Provisional application No. 62/216,619, filed on Sep. 10, 2015.

(51) Int. Cl.
B32B 27/08 (2006.01)
B32B 5/02 (2006.01)
(Continued)

(52) U.S. Cl.
CPC ............. B32B 27/08 (2013.01); B32B 5/022 (2013.01); B32B 27/12 (2013.01); B32B 27/32 (2013.01);
(Continued)

(58) Field of Classification Search
CPC ......... B32B 27/08; B32B 5/022; B32B 27/12; B32B 27/32; B32B 2250/04;
(Continued)

(56) References Cited

U.S. PATENT DOCUMENTS 4,076,698 A    2/1978   Anderson et al.
4,599,392 A    7/1986   McKinney et al.
(Continued)

FOREIGN PATENT DOCUMENTS

EP    1321288 A2    6/2003
EP    1697126 A1    9/2006
(Continued)

OTHER PUBLICATIONS http://www.matweb.com/search/datasheet.aspx?matguid=7bc4308b253f42dfbb2f43bb0a0c123a&ckck=1 (Year: 2020).*
(Continued)

Primary Examiner — Samir Shah

(57) ABSTRACT

A multilayer film including a core layer and two skin layers, wherein the core layer is positioned between the two skin layers, wherein the core layer includes a polyethylene composition including a high density polyethylene having a density of 0.930-0.965 g/cc and a melt index of 0.7-10.0 g/10 min, and wherein each skin layer independently includes a polypropylene composition including greater than 50 wt. %, based on the total weight of the polypropylene composition, of a propylene-based polymer.

8 Claims, 6 Drawing Sheets

(51) Int. Cl.
*B32B 27/12* (2006.01)
*B32B 27/32* (2006.01)

(52) U.S. Cl.
CPC ........ *B32B 2250/03* (2013.01); *B32B 2250/04* (2013.01); *B32B 2250/242* (2013.01); *B32B 2250/40* (2013.01); *B32B 2270/00* (2013.01); *B32B 2307/54* (2013.01); *B32B 2307/558* (2013.01); *B32B 2307/581* (2013.01); *B32B 2307/718* (2013.01); *B32B 2323/043* (2013.01); *B32B 2323/046* (2013.01); *B32B 2323/10* (2013.01); *B32B 2555/00* (2013.01); *B32B 2555/02* (2013.01)

(58) Field of Classification Search
CPC ......... B32B 2270/00; B32B 2307/718; B32B 2250/03; B32B 2307/558; B32B 2555/02; B32B 2307/581; B32B 2307/54; B32B 2323/043; B32B 2555/00; B32B 2250/242; B32B 2323/046; B32B 2323/10; B32B 2250/40
See application file for complete search history.

(56) References Cited

U.S. PATENT DOCUMENTS

| | | | | |
|---|---|---|---|---|
| 5,891,555 A * | 4/1999 | O'Brien | ................ | B29C 55/023 428/213 |
| 2003/0106560 A1* | 6/2003 | Griesbach, III | .. | A61F 13/51405 128/849 |
| 2004/0224596 A1 | 11/2004 | Mathis et al. | | |
| 2007/0178784 A1 | 8/2007 | Jones et al. | | |
| 2008/0311261 A1* | 12/2008 | Gullick | ................... | B32B 27/18 426/411 |
| 2009/0110913 A1* | 4/2009 | Vinck | .................... | B32B 27/32 428/334 |
| 2010/0119745 A1* | 5/2010 | Nieto | ....................... | B32B 7/02 428/35.7 |

FOREIGN PATENT DOCUMENTS

| | | |
|---|---|---|
| EP | 2141016 A1 | 1/2010 |
| WO | 1996/038299 A1 | 12/1996 |
| WO | 2000/038843 A1 | 7/2000 |
| WO | 2000/074948 A1 | 12/2000 |
| WO | 2003/040442 A1 | 5/2003 |
| WO | 2004/024433 | 3/2004 |
| WO | 2005/023912 A2 | 3/2005 |
| WO | 2006/115839 A1 | 11/2006 |
| WO | 2007/024447 A1 | 3/2007 |
| WO | 2015/054351 A1 | 4/2015 |

OTHER PUBLICATIONS

PCT/US2016/049354, Search Report dated Mar. 16, 2017.
PCT/US2016/049354, Written Opinion dated Mar. 16, 2017.
PCT/US2016/049354, IPRP dated Mar. 13, 2018.

* cited by examiner

MULTILAYER FILMS, AND ARTICLES MADE THEREFROM

TECHNICAL FIELD

Embodiments of the present disclosure generally relate to multilayer films and applications of the multilayer films to make articles, such as, for example, ultrasonically-bonded laminates. In particular, this disclosure relates to non-breathable multilayer films.

BACKGROUND

Cloth-like backsheets have become increasingly desirable for use in hygiene absorbent products, such as, for example, diapers, adult incontinence products, and feminine hygiene articles, in order to provide good haptics, such as softness, and low noise, while still offering sufficient barrier properties to perform its primary function of containing fluids. Cloth-like backsheets typically include a nonwoven substrate and a film laminated together, and depending on the lamination technology involved, the haptics of the backsheet can vary. Several different lamination technologies exist for joining films and nonwovens, and can include, for example, extrusion coating, hot melt adhesive, solvent-less adhesives, and ultrasonic bonding. Each lamination technique has its own particularities. In recent years, ultrasonic bonding has become an emerging lamination technology for use in producing backsheets; however, it is not without its challenges. One major challenge observed when using ultrasonic bonding is that where different types of materials are used for the nonwoven substrate and the film, (e.g., a polyethylene-based film laminated to a polypropylene nonwoven substrate), adhesion is adversely affected often resulting in a poor bond between the two. In addition, pinholes can result which can destroy the liquid barrier functionality of the backsheet.

Accordingly, alternative multilayer films that can provide good adhesion to a nonwoven polypropylene substrate, and articles comprising multilayer films having good haptics, such as, softness and low noise, as well as, reduced pinholes are desired.

SUMMARY

Disclosed in embodiments herein are multilayer films. The multilayer films comprise a core layer and two skin layers, wherein the core layer is positioned between the two skin layers, wherein the core layer comprises a polyethylene composition comprising a high density polyethylene having a density of 0.930-0.965 g/cc and a melt index of 0.7-10.0 g/10 min, and wherein each skin layer independently comprises a polypropylene composition comprising greater than 50 wt. %, based on the total weight of the polypropylene composition, of a propylene-based polymer.

Also disclosed in embodiments herein are ultrasonically bonded laminates. The ultrasonically bonded laminates comprise a multilayer film comprising a core layer and two skin layers, wherein the core layer is positioned between the two skin layers, wherein the core layer comprises a polyethylene composition comprising a high density polyethylene having a density of 0.930-0.965 g/cc and a melt index of 0.7-10.0 g/10 min, and wherein each skin layer independently comprises a polypropylene composition comprising greater than 50 wt. %, based on the total weight of the polypropylene composition, of a propylene-based polymer; and a nonwoven substrate at least partially ultrasonically bonded to the multilayer film to form a laminate.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
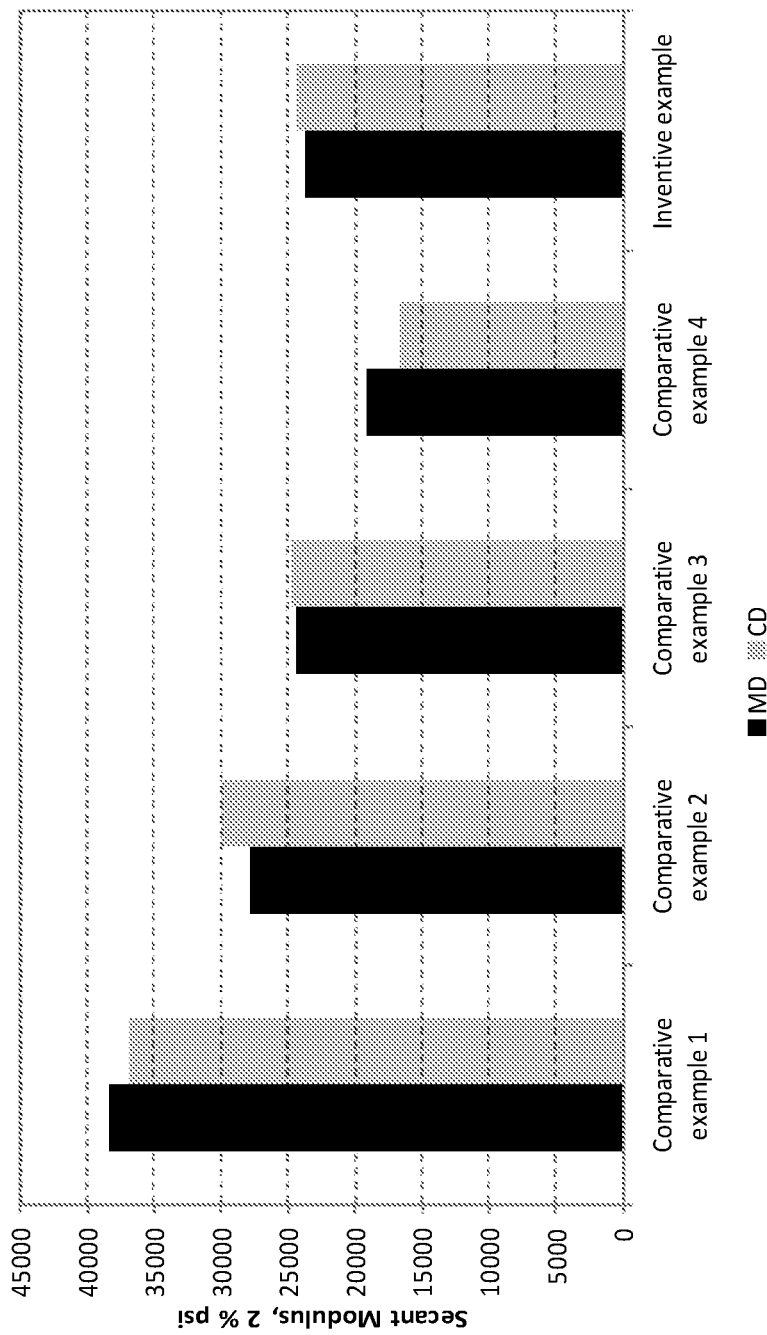
FIG. 1 graphically depicts the 2% secant modulus for a multilayer film according to one or more embodiments shown or described herein in comparison to several comparative films.

Reference will now be made in detail to embodiments of multilayer films and ultrasonically-bonded laminates, examples of which are further described in the accompanying figures. The multilayer films and ultrasonically-bonded laminates may be used to produce cloth-like backsheets. It is noted, however, that this is merely an illustrative implementation of the embodiments disclosed herein. The embodiments are applicable to other technologies that are susceptible to similar problems as those discussed above. For example, the multilayer films and ultrasonically-bonded laminates may be used to produce cloth-like wipes, face masks, surgical gowns, tissues, bandages and wound dressings, all of which are clearly within the purview of the present embodiments. As used herein, "multilayer film" refers to a film having two or more layers that are at least partially contiguous and preferably, but optionally, coextensive.

In embodiments herein, the multilayer films comprise a core layer and two skin layers. The core layer is positioned between the two skin layers. In some embodiments, the multilayer films may comprise one or more additional layers, such as structural, barrier, or tie layers, positioned between the core layer and each skin layer. Various materials can be used for these layers and can include polypropylene-based plastomers or elastomers, ethylene/vinyl alcohol (EVOH) copolymers, polyvinylidene chloride (PVDC), polyethylene terepthalate (PET), oriented polypropylene (OPP), ethylene/vinyl acetate (EVA) copolymers, ethylene/acrylic acid (EAA) copolymers, ethylene/methacrylic acid (EMAA) copolymers, polyacrylic imides, butyl acrylates, peroxides (such as peroxypolymers, e.g., peroxyolefins), silanes (e.g., epoxysilanes), reactive polystyrenes, chlorinated polyethylene, olefin block copolymers, propylene copolymers, propylene-ethylene copolymers, ULDPE, LLDPE, HDPE, MDPE, LMDPE, LDPE, ionomers, and graft-modified polymers (e.g., maleic anhydride grafted polyethylene).

The thickness ratio of both skin layers to the core layer can be a ratio suitable to impart good ultrasonic bonding properties to the film. In some embodiments, the thickness ratio of both skin layers to the core layer may be 1:10 to 1:1. In other embodiments, the thickness ratio of both skin layers to the core layer may be 1:5 to 1:1. In further embodiments, the thickness ratio of both skin layers to the core layer may be 1:4 to 1:2. The thickness ratio of both skin layers to the core layer can also be captured by percentages. For example, in some embodiments, the core layer comprises greater than 50% to 85% of the overall film thickness. In other embodiments, the core layer comprises from 60% to 85% of the overall film thickness. In further embodiments, the core layer comprises from 65% to 80% of the overall film thickness. In embodiments herein, the two skin layers may have an equal thickness, or alternatively, may have an unequal thickness.

Core Layer

The core layer comprises a polyethylene composition. As used herein, "polyethylene composition" refers to a composition containing greater than 50 wt. % of polyethylene polymers. "Polyethylene" refers to a homopolymer of ethylene or a copolymer of ethylene with one or more comonomers with a majority of its polymer units derived from ethylene. In some embodiments, the polyethylene composition comprises greater than 55 wt. %, greater than 60 wt. %, greater than 65 wt. %, greater than 70 wt. %, greater than 75 wt. %, greater than 80 wt. %, greater than 85 wt. %, greater than 90 wt. %, greater than 95 wt. %, greater than 99 wt. %, greater than 99.5 wt. %, or 100 wt. %, by weight of the polyethylene composition, of polyethylene polymers.

In embodiments herein, the polyethylene composition may have an overall density of 0.930-0.960 g/cc. All individual values and subranges from 0.930-0.960 g/cc are included and disclosed herein. For example, in some embodiments, the polyethylene composition has an overall density of 0.935-0.960 g/cc. In other embodiments, the polyethylene composition has an overall density of 0.938-0.960 g/cc. In further embodiments, the polyethylene composition has an overall density of 0.940-0.955 g/cc. Density for ethylene-based polymers is determined according to ASTM D-792.

The polyethylene composition may have an overall melt index of about 1.0-8.0 g/10 min. All individual values and subranges from 1.0-8.0 g/10 min are included and disclosed herein. For example, in some embodiments, the polyethylene composition has a melt index of 2.0-8.0 g/10 min. In other embodiments, the polyethylene composition has a melt index of 3.0-8.0 g/10 min. In further embodiments, the polyethylene composition has a melt index of 4.0-8.0 g/10 min. Melt index, or $I_2$, for ethylene-based polymers is determined according to ASTM D1238 at 190° C., 2.16 kg.

The polyethylene composition comprises a high density polyethylene. In embodiments herein, the polyethylene composition may comprise at least 40%, by weight of the polyethylene composition, of a high density polyethylene. In some embodiments, the polyethylene composition comprises at least 50%, at least 55%, at least 60%, at least 65%, at least 70%, at least 75%, at least 80%, or at least 85%, by weight of the polyethylene composition, of a high density polyethylene.

The high density polyethylene is a polymer that contains more than 50 mole percent polymerized ethylene monomer (based on the total amount of polymerizable monomers) and, optionally, may contain at least one comonomer. The α-olefin comonomers typically have no more than 20 carbon atoms. For example, the α-olefin comonomers may have 3 to 10 carbon atoms, or 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The high density polyethylene may be produced in various commercially available continuous reaction processes, particularly, those comprising two or more individual reactors in series or parallel using slurry, solution or gas phase process technology or hybrid reaction systems (e.g. combination of slurry and gas phase reactor). Exemplary processes may be found in U.S. Pat. No. 4,076,698, which is herein incorporated by reference. Alternatively, the high density polyethylene may also be produced by offline blending of 2 or more different polyethylene resins. For example, in some embodiments, a conventional mono-modal Ziegler-Natta high density polyethylene may be blended with a multi-modal Ziegler-Natta high density polyethylene. It is further contemplated, however, that the various high density polyethylene polymers can be produced with alternative catalyst systems, such as, metallocene, post-metallocene, or chromium-based catalysts. Exemplary high density polyethylene resins may include resins sold by The Dow Chemical Company under the trade name HDPE 5962B, DMDA 8007 NT 7, AGILITY™ 6047G and DOWLEX™ 2027G.

In some embodiments, the high density polyethylene may be prepared in accordance with the following procedure. All raw materials (monomer and comonomer) and the process solvent (a narrow boiling range high-purity isoparaffinic solvent) are purified with molecular sieves before introduction into the reaction environment. Hydrogen may be supplied in pressurized cylinders as a high purity grade and is not further purified. The reactor monomer feed stream may be pressurized via a mechanical compressor to above reaction pressure. The solvent and comonomer feed may be pressurized via a pump to above reaction pressure. The individual catalyst components may be pressured via a pump to above reaction pressure. All reaction feed flows may be measured with mass flow meters and independently controlled with computer automated valve control systems or metering pumps. The fresh comonomer feed may be mechanically pressurized and can be injected into the process at several potential locations depending on reactor configuration which include: only the feed stream for the first reactor, only the feed stream for the second reactor, or into a common stream prior to the solvent split to the two reactors. Some comonomer injection combinations are only possible when running dual reactor configuration.

Reactor configuration options include single reactor operation, dual series reactor operation, or dual parallel reactor operation. The continuous solution polymerization reactor may consist of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds may be possible. The total fresh feed stream to the reactor (solvent, monomer, comonomer, and hydrogen) may be temperature controlled by passing the feed stream through a heat exchanger. The total fresh feed to the polymerization reactor may be injected into the reactor at two locations with approximately equal reactor volumes between each injection location. The fresh feed may be controlled with each feed zone receiving half of the total ethylene feed mass flow to that reactor. The catalyst components may be injected into the polymerization reactor through specially designed injection stingers for each component. The primary catalyst component feed may be computer controlled to maintain the reactor monomer concentration at a specified target. The cocatalyst component(s) may be fed based on calculated specified molar ratios to the primary catalyst component Immediately following each fresh injection location (either feed, catalyst, or effluent from the upstream reactor if in series reactor configuration), the feed streams may be mixed with the circulating polymerization reactor contents with static mixing elements. The contents of the reactor may be continuously circulated through heat exchangers responsible for removing much of the heat of reaction and with the temperature of the coolant side responsible for maintaining an isothermal reaction environment at the specified temperature. Circulation around the reactor loop may be provided by a pump.

In a dual series reactor configuration the effluent from the first polymerization reactor (containing solvent, monomer, comonomer, hydrogen, catalyst components, and polymer) exits the first reactor loop and may be added to the second reactor loop in the general vicinity/downstream of the second reactor lower pressure fresh feed injection. In a dual parallel reactor configuration the effluent streams from the first and the second polymerization reactors may be combined prior to any additional processing. In all reactor configurations the final reactor effluent (second reactor effluent for dual series, the combined effluent for dual parallel, or the single reactor effluent) enters a zone where it is deactivated with the addition of and reaction with a suitable reagent (typically water). At this same reactor exit location other additives may also be added.

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer may be recycled back to the reactor after passing through a purification system. A small amount of solvent and comonomer may be purged from the process.

In embodiments described herein, the high density polyethylene has a density of about 0.930-0.965 g/cc. All individual values and subranges from 0.930-0.965 g/cc are included and disclosed herein. For example, in some embodiments, the high density polyethylene has a density of 0.940-0.965 g/cc. In other embodiments, the high density polyethylene has a density of 0.940-0.960 g/cc. In further embodiments, the high density polyethylene has a density of 0.945-0.955 g/cc.

In embodiments described herein, the high density polyethylene has a melt index of 0.7-10 g/10 min. All individual values and subranges from 0.7-10 g/10 min are included and disclosed herein. For example, in some embodiments, the high density polyethylene has a melt index of 2-10 g/10 min. In other embodiments, the high density polyethylene has a melt index of 3-8 g/10 min. In further embodiments, the high density polyethylene has a melt index of 5-7 g/10 min. In embodiments described herein, the high density polyethylene may have a $I_{10}/I_2$ ratio of from 4 to 9, 4.5 to 8.5, 5 to 8.5. 5.5 to 8, or 6.0 to 7.5.

In embodiments described herein, the high density polyethylene may have a molecular weight distribution (MWD or Mw/Mn), as measured by conventional gel permeation chromatography (GPC) of from 2.5 to less than 4.5. All individual values and subranges of from 2.5 to less than 4.5 are included and disclosed herein. For example, in some embodiments, the high density polyethylene may have a MWD, as measured by GPC, of from 2.5 to 4.0, 2.8 to 4.0, 2.8 to 3.8, 2.8 to 3.5, or 2.8 to 3.3. The GPC test method is outlined below.

In embodiments described herein, the high density polyethylene may have a number average molecular weight, as measured by GPC, of 15,000 to 35,000 g/mol. All individual values and subranges of 15,000 to 35,000 g/mol are included and disclosed herein. For example, in some embodiments, the high density polyethylene may have a number average molecular weight, as measured by GPC, of 18,000 to 30,000 g/mol, 20,000 to 30,000 g/mol, 22,000 to 30,000 g/mol, 22,000 to 28,000 g/mol, or 22,000 to 26,000 g/mol.

In embodiments described herein, the high density polyethylene may have a weight average molecular weight, as measured by GPC, of 65,000 to 95,000 g/mol. All individual values and subranges of 65,000 to 95,000 g/mol are included and disclosed herein. For example, in some embodiments, the high density polyethylene may have a weight average molecular weight, as measured by GPC, of 65,000 to 90,000 g/mol, 65,000 to 85,000 g/mol, 68,000 to 85,000 g/mol, 70,000 to 85,000 g/mol, or 72,000 to 82,000 g/mol.

In embodiments described herein, the high density polyethylene may have a z average molecular weight, as measured by GPC, of 200,000 to 275,000 g/mol. All individual values and subranges of 200,000 to 275,000 g/mol are included and disclosed herein. For example, in some embodiments, the high density polyethylene may have a z average molecular weight, as measured by GPC, of 200,000 to 265,000 g/mol, 200,000 to 255,000 g/mol, 200,000 to 250,000 g/mol, 210,000 to 255,000 g/mol, 210,000 to 250,000 g/mol, or 220,000 to 250,000 g/mol.

In embodiments described herein, the polyethylene composition may further comprise a low density polyethylene (LDPE). In some embodiments, the polyethylene composition may further comprise from 0 to 30%, by weight of the polyethylene composition, of a low density polyethylene (LDPE). All individual values and subranges from 0 to 30% are included and disclosed herein. For example, in some embodiments, the polymer blend may further comprise less than 30%, by weight of the polyethylene composition, of a low density polyethylene. In some embodiments, the polymer blend may further comprise from 5 to 20%, by weight of the polyethylene composition, of a low density polyethylene. In other embodiments, the polymer blend may further comprise from 5 to 15%, by weight of the polyethylene composition, of a low density polyethylene. In further, embodiments, the polymer blend may further comprise from 10 to 15%, by weight of the polyethylene composition, of a low density polyethylene.

In embodiments herein, the LDPE present in the polyethylene composition may have a density of about 0.915-0.935 g/cc. All individual values and subranges from 0.915-0.935 g/cc are included and disclosed herein. For example, in some embodiments, the LDPE has a density of 0.915-0.930 g/cc. In other embodiments, the LDPE has a density of 0.915-0.925 g/cc. In further embodiments, the LDPE has a density of 0.915-0.922 g/cc. In embodiments herein, the LDPE present in the polyethylene composition has a melt index of 0.2-15 g/10 min. All individual values and subranges from 0.2-15 g/10 min are included and disclosed herein. For example, in some embodiments, the LDPE has a melt index of 0.2-12 g/10 min. In other embodiments, the LDPE has a melt index of 0.5-10 g/10 min.

The LDPE present in the polyethylene composition may have a melt strength of greater than 5 cN. All individual values and subranges of greater than 5 cN are included and disclosed herein. For example, in some embodiments, the LDPE has a melt strength of from 6-15 cN. In other embodiments, the LDPE has a melt strength of from 6-14 cN. In further embodiments, the LDPE has a melt strength of from 6-12 cN. In further embodiments, the LDPE has a melt strength of from 6-10 cN. In even further embodiments, the LDPE has a melt strength of from 6-18 cN.

The LDPE may include branched interpolymers that are partly or entirely homopolymerized or copolymerized in autoclave or tubular reactors at pressures above 14,500 psi (100 MPa) with the use of free-radical initiators, such as peroxides (see, for example U.S. Pat. No. 4,599,392, which is herein incorporated by reference). Examples of suitable LDPEs may include, but are not limited to, ethylene homopolymers, and high pressure copolymers, including ethylene interpolymerized with, for example, vinyl acetate, ethyl acrylate, butyl acrylate, acrylic acid, methacrylic acid, carbon monoxide, or combinations thereof. Exemplary LDPE resins may include resins sold by The Dow Chemical Company, such as, LDPE 722, LDPE 5004 and LDPE 621i. Other exemplary LDPE resins are described in WO 2005/023912, which is herein incorporated by reference.

The polyethylene composition may further comprise one or more polymers (e.g., MDPE, an additional HDPE resin, etc.) and/or may optionally comprise one or more additives. Such additives may include, but are not limited to, antioxidants (e.g., hindered phenolics, such as, IRGANOX® 1010 or IRGANOX® 1076, supplied by Ciba Geigy), phosphites (e.g., IRGAFOS® 168, also supplied by Ciba Geigy), cling additives (e.g., PIB (polyisobutylene)), Standostab PEPQ™ (supplied by Sandoz), pigments, colorants, fillers (e.g., calcium carbonate, talc, mica, kaolin, perlite, diatomaceous earth, dolomite, magnesium carbonate, calcium sulfate, barium sulfate, glass beads, polymeric beads, ceramic beads, natural and synthetic silica, aluminum trihydroxide, magnesium trihydroxide, wollastonite, whiskers, wood flour, lignine, starch), $TiO_2$, anti-stat additives, flame retardants, biocides, antimicrobial agents, and clarifiers/nucleators (e.g., HYPERFORM™ HPN-20E, MILLAD™ 3988, MILLAD™ NX 8000, available from Milliken Chemical). The one or more additives can be included in the polyethylene composition at levels typically used in the art to achieve their desired purpose. In some examples, the one or more additives are included in amounts ranging from 0-10 wt. % of the polyethylene composition, 0-5 wt. % of the polyethylene composition, 0.001-5 wt. % of the polyethylene composition, 0.001-3 wt. % of the polyethylene composition, 0.05-3 wt. % of the polyethylene composition, or 0.05-2 wt. % of the polyethylene composition.

Skin Layers

Each skin layer independently comprises a polypropylene composition. As used herein, "polypropylene composition" refers to a composition containing greater than 50 wt. %, based on the total weight of the polypropylene composition, of a propylene-based polymer. In some embodiments, each skin layer may independently comprise at least 30 wt. % of the polypropylene composition, at least 40 wt. % of the polypropylene composition, at least 50 wt. % of the polypropylene composition, at least 55 wt. % of the polypropylene composition, at least 60 wt. % of the polypropylene composition, at least 65 wt. % of the polypropylene composition, at least 75 wt. % of the polypropylene composition, at least 80 wt. %, at least 90 wt. %, at least 95 wt. %, at least 99 wt. %, or 100 wt. % of the polypropylene composition.

As stated above, the polypropylene composition comprises greater than 50 wt. %, based on the total weight of the polypropylene composition, of a propylene-based polymer. In some embodiments, the polypropylene composition comprises greater than 55 wt. %, greater than 60 wt. %, greater than 65 wt. %, greater than 70 wt. %, greater than 75 wt. %, greater than 80 wt. %, greater than 85 wt. %, greater than 90 wt. %, greater than 95 wt. %, greater than 99 wt. %, or 100 wt. %, based on the total weight of the polypropylene composition, of a propylene-based polymer.

The propylene-based polymer comprises a majority weight percent of polymerized propylene monomer (based on the total amount of polymerizable monomers), and optionally, one or more comonomers. The propylene-based polymer may be a polypropylene homopolymer (i.e., a polypropylene), a polypropylene copolymer, a propylene-based elastomer or plastomer, or combinations thereof. The polypropylene homopolymer may be isotactic, atactic or syndiotactic. In some embodiments, the polypropylene homopolymer is isotactic. The polypropylene copolymer may be a propylene/olefin copolymer (random or block) or a propylene impact copolymer. Impact propylene copolymers may also include heterophasic propylene copolymers, where polypropylene is the continuous phase and an elastomeric phase is uniformly dispersed therein. For propylene/olefin copolymers, nonlimiting examples of suitable olefin comonomers include ethylene, $C_4$-$C_{20}$ α-olefins, such as 1-butene, 1-pentene, 1-hexene, 4-methyl-1-pentene, 1-heptene, 1-octene, 1-decene, or 1-dodecene; $C_4$-$C_{20}$ diolefins, such as 1,3-butadiene, 1,3-pentadiene, norbornadiene, 5-ethylidene-2-norbornene (ENB) and dicyclopentadiene; $C_8$-$C_{40}$ vinyl aromatic compounds, such as styrene, o-, m-, and p-methylstyrene, divinylbenzene, vinylbiphenyl, vinylnapthalene; and halogen-substituted $C_8$-$C_{40}$ vinyl aromatic compounds, such as chlorostyrene and fluorostyrene. In some embodiments, the propylene/olefin copolymers include propylene/ethylene, propylene/1-butene, propylene/1-hexene, propylene/4-methyl-1-pentene, propylene/1-octene, or propylene/ethylene/1-butene. In some embodiments, the propylene-based polymer is a random or block propylene/alpha-olefin copolymer. In some embodiments, the propylene-based polymer is a propylene impact copolymer.

The propylene-based plastomer or elastomer comprise at least about 50 weight percent of units derived from propylene and at least about 5 weight percent of units derived from a comonomer other than propylene, e.g., ethylene, a $C_{4-20}$ α-olefin, a $C_{4-20}$ diene, or a styrenic compound. The amount of comonomer other than ethylene in the propylene based elastomer or plastomer is a function of, at least in part, the comonomer and the desired heat of fusion of the copolymer. Suitable propylene-based plastomers or elastomers are taught in WO2006/115839, WO03/040442, and WO/2007/024447, each of which is hereby incorporated by reference in its entirety. Exemplary propylene-based plastomers or elastomers may include the VERSIFY™ 3401 compatibilizer (from The Dow Chemical Company) or the VISTAMAXX™ 6202 compatibilizer (from Exxon Mobil Corporation).

Suitable propylene-based polymers are formed by means within the skill in the art, for example, using Ziegler-Natta catalysts, a single-site catalysts (metallocene or constrained geometry), or non-metallocene, metal-centered, heteroaryl ligand catalysts. Exemplary propylene-based polymer resins may include PP 3155 commercially available from the Exxon Mobil Corporation, USA, polypropylene 6231, commercially available from LyondellBasell Industries, USA or resins sold under the trade name VERSIFY™ commercially available from The Dow Chemical Company, USA, VISTAMAXX™ (commercially available from ExxonMobil Chemical Company) propylene polymers commercially available from Braskem under various tradenames and/or trademarks, PROFAX® (commercially available from Lyondell Basell) or *Borealis* BORSOFT™ (commercially available from *Borealis* of Denmark).

In embodiments herein, the propylene-based polymer has a melt flow rate (MFR) from 0.1 g/10 min to 100 g/10 min. All individual values and subranges from 0.1 g/10 min to 100 g/10 min are included and disclosed herein. For example, in some embodiments, the propylene-based polymer has a melt flow rate from 1 g/10 min to 75 g/10 min, from 2 g/10 min to 50 g/10 min, from 10 g/10 min to 45 g/10 min, or from 15 g/10 min to 40 g/10 min, as measured in accordance with ASTM D1238 (230° C., 2.16 kg). In embodiments herein, the propylene-based polymer has a density of 0.890 to 0.920 g/cc. All individual values and subranges from 0.890 to 0.920 g/cc are included and disclosed herein. For example, in some embodiments, propylene-based polymer has a density of 0.900 to 0.920 g/cc, or from 0.89 to 0.915 g/cc. The density may be determined according to ASTM D-792.

The propylene-based polymer may have a 2% secant modulus of greater than 15,000 psi. The 2% secant modulus is an average of the secant modulus in the machine direction (MD) and the cross direction (CD), and may be calculated as follows:

$$2\% \text{ secant modulus} = \frac{(2\% \text{ secant modulus } (MD) + 2\% \text{ secant modulus}(CD))}{2}$$

All individual values and subranges greater than 15,000 psi are included and disclosed herein. For example, in some embodiments, the propylene-based polymer has a 2% secant modulus of greater than 17,500 psi. In other embodiments, the propylene-based polymer has a 2% secant modulus of greater than 20,000 psi. In further embodiments, the propylene-based polymer has a 2% secant modulus of greater than 27,500 psi. In even further embodiments, the propylene-based polymer has a 2% secant modulus of greater than 35,000 psi. In even further embodiments, the propylene-based polymer has a 2% secant modulus of from 15,000 psi to 50,000 psi. In even further embodiments, the propylene-based polymer has a 2% secant modulus of from 25,000 psi to 45,000 psi. In even further embodiments, the propylene-based polymer has a 2% secant modulus of from 30,000 psi to 45,000 psi. The 2% secant modulus may be determined according to ASTM 882.

In some embodiments herein, the polypropylene composition may further comprise a low density polyethylene (LDPE). The polypropylene composition may independently comprise 5 wt. % to 30 wt. %, 10 wt. % to 30 wt. %, or 15 wt. % to 25 wt. % of the LDPE. The LDPE present in the polypropylene composition has a density of about 0.915-0.930 g/cc. All individual values and subranges from 0.915-0.930 g/cc are included and disclosed herein. For example, in some embodiments, the LDPE has a density of 0.915-0.925 g/cc. In other embodiments, the LDPE has a density of 0.915-0.920 g/cc. In embodiments herein, the LDPE present in the skin layers has a melt index of 1-15 g/10 min. All individual values and subranges from 1-15 g/10 min are included and disclosed herein. For example, in some embodiments, the LDPE has a melt index of 2-12 g/10 min. In other embodiments, the LDPE has a melt index of 5-10 g/10 min.

The LDPE present in the polypropylene composition may have a melt strength of greater than 5 cN. All individual values and subranges of greater than 5 cN are included and disclosed herein. For example, in some embodiments, the LDPE has a melt strength of from 6-15 cN. In other embodiments, the LDPE has a melt strength of from 6-14 cN. In further embodiments, the LDPE has a melt strength of from 6-12 cN. In further embodiments, the LDPE has a melt strength of from 6-10 cN. In even further embodiments, the LDPE has a melt strength of from 6-18 cN.

LDPEs present in the polypropylene composition may include branched polymers that are partly or entirely homopolymerized or copolymerized in autoclave or tubular reactors at pressures above 14,500 psi (100 MPa) with the use of free-radical initiators, such as peroxides (see for example U.S. Pat. No. 4,599,392, incorporated herein by reference). Examples of suitable LDPEs present in the polypropylene composition may include, but are not limited to, ethylene homopolymers, and high pressure copolymers, including ethylene interpolymerized with, for example, vinyl acetate, ethyl acrylate, butyl acrylate, acrylic acid, methacrylic acid, carbon monoxide, or combinations thereof. Exemplary LDPE resins may include resins sold by The Dow Chemical Company, such as, LDPE 722, LDPE 5004, and LDPE 621i. Other exemplary LDPE resins are described in WO 2005/023912, which is herein incorporated by reference.

Each skin layer may independently comprise one or more additives. Such additives may include, but are not limited to, antioxidants (e.g., hindered phenolics, such as, IRGANOX® 1010 or IRGANOX® 1076, supplied by Ciba Geigy), phosphites (e.g., IRGAFOS® 168, also supplied by Ciba Geigy), cling additives (e.g., PIB (polyisobutylene)), Standostab PEPQ™ (supplied by Sandoz), pigments, colorants, fillers (e.g., calcium carbonate, mica, talc, kaolin, perlite, diatomaceous earth, dolomite, magnesium carbonate, calcium sulfate, barium sulfate, glass beads, polymeric beads, ceramic beads, natural and synthetic silica, aluminum trihydroxide, magnesium trihydroxide, wollastonite, whiskers, wood flour, lignine, starch), $TiO_2$, anti-stat additives, flame retardants, slip agents, antiblock additives, biocides, antimicrobial agents, and clarifiers/nucleators (e.g., HYPERFORM™ HPN-20E, MILLAD™ 3988, MILLAD™ NX 8000, available from Milliken Chemical). The one or more additives can be included in the polypropylene composition at levels typically used in the art to achieve their desired purpose. In some examples, the one or more additives are included in amounts ranging from 0-10 wt. % of the polypropylene composition, 0-5 wt. % of the polypropylene composition, 0.001-5 wt. % of the polypropylene composition, 0.001-3 wt. % of the polypropylene composition, 0.05-3 wt. % of the polypropylene composition, or 0.05-2 wt. % of the polypropylene composition.

Multilayer Films

The multilayer films described herein may be coextruded films. In some embodiments, the multilayer film is a coextruded film, whereby at least one of the skin layers is coextruded to the core layer. In other embodiments, the multilayer film is a coextruded film, whereby one of the skin layers (i.e., a first skin layer) is coextruded to the core layer and the other skin layer (i.e., a second skin layer) is coextruded to the core layer, and the two coextruded films are laminated together such that the core layer is positioned between the two skin layers. In further embodiments, the multilayer film is a coextruded film, whereby the skin layers are coextruded to the core layer.

In embodiments herein, the multilayer film may have a basis weight of between about 8-30 gsm. All individual values and subranges from 8-30 gsm are included and disclosed herein. For example, in some embodiments, the multilayer film may have a basis weight of between about 10-25 gsm. In other embodiments, the multilayer film may have a basis weight of between about 10-20 gsm. In further embodiments, the multilayer film may have a basis weight of between about 12-16 gsm.

In some embodiments, the multilayer films described herein may exhibit at least one of the following properties: a spencer dart impact of greater than about 140 g (or, alternatively, greater than 145 g or 150 g); a 2% secant modulus of greater than about 20,000 psi in the MD (or alternatively, greater than 21,000 psi or 22,000 psi) and greater than 20,000 psi in the CD (or alternatively, greater than 22,000 psi); a stress at break (also called load at break) in the cross-direction of greater than about 1,800 psi (or, alternatively, greater than about 1,850 psi or 1,900 psi), and in the machine direction of greater than about 1,700 psi (or, alternatively, greater than about 1,750 psi, 1,850 psi, or 1,900 psi); or a puncture resistance greater than about 13 ft·lb$_f$/in$^3$ (or, alternatively, 14 ft·lb$_f$/in$^3$ or 15 ft·lb$_f$/in$^3$). In some embodiments, the multilayer films described herein may exhibit at least one of the following properties: a softness value difference of less than 15%, when compared to a 100% polyethylene film having a 2% secant modulus greater than about 16,000 psi in the MD, or a noise value of less than 0.5 dB between a frequency band of 1,000 Hz and 5,000 Hz. The Softness Value Difference (SVD) may be calculated as follows:

$$SVD = \frac{|\text{Softness Value (inventive film)} - \text{Softness Value (reference film)}|}{\text{Softness Value (reference film)}} \times 100\%$$

wherein the reference film is a 100% polyethylene film having a 2% secant modulus of greater than 16,000 psi. As used herein a "100% polyethylene film" refers to a film consisting of one or more polymers that contain more than 50 mole percent polymerized ethylene monomer (based on the total amount of polymerizable monomers) and, optionally, may contain at least one comonomer. Without being bound by theory, it is believed that one or more of the properties result from improved film structure and improved component amounts in each layer of the film structure such that key attributes of each material are incorporated. In particular, it is believed that incorporating particular amounts of polypropylene into the skin layers can assist in adhesion, while selecting a particular polyethylene blend in the core layer can avoid pinholes that may form between polypropylene substrates and polyethylene films, while still providing adequate strength and modulus necessary for a backsheet. It is also believed that by selecting certain polyethylene polymers for incorporation into the core and skin layers, the haptics properties, in particular, noise and softness, can be improved.

Laminates

Also described herein are ultrasonically-bonded laminates. The ultrasonically-bonded laminates comprise a multilayer film as previously described herein, and a nonwoven substrate at least partially ultrasonically bonded to the multilayer film. As used herein, "nonwoven substrates" include nonwoven webs, nonwoven fabrics and any nonwoven structure in which individual fibers or threads are interlaid, but not in a regular or repeating manner Nonwoven substrates described herein may be formed by a variety of processes, such as, for example, air laying processes, meltblowing processes, spunbonding processes and carding processes, including bonded carded web processes. As used herein, "ultrasonic-bonding" includes ultrasonic welding.

In embodiments herein, the nonwoven substrate is made from a propylene-based material, 100% polyethylene, or polyethylene/polypropylene structure/blends. Examples of suitable propylene-based materials include materials that comprise a majority weight percent of polymerized propylene monomer (based on the total amount of polymerizable monomers), and optionally, one or more comonomers. This may include propylene homopolymer (i.e., a polypropylene), a propylene copolymer, or combinations thereof. The propylene copolymer may be a propylene/olefin copolymer. Nonlimiting examples of suitable olefin comonomers include ethylene, $C_4$-$C_{20}$ α-olefins, such as 1-butene, 1-pentene, 1-hexene, 4-methyl-1-pentene, 1-heptene, 1-octene, 1-decene, or 1-dodecene. In some embodiments, the propylene-based material is polypropylene homopolymer.

The nonwoven substrate may comprise one or more layers. The one or more layers may be spunbond non-woven layers (S), meltblown non-woven layers (M), wet-laid non-woven layers, air-laid non-woven layers, webs produced by any non-woven or melt spinning process. In some embodiments, the nonwoven substrate comprises at least one spunbond layer (S) and at least one meltblown layer (M). In other embodiments, the nonwoven substrate comprises at least one spunbond layer (S) and at least one meltblown layer (M), and may have one of the following structures: SSS, SM, SMS, SMMS, SSMMS, or SSMMMS. The outermost spunbond layer may comprise a material selected from the group consisting of spunbond homopolymer polypropylene (hPP), spunbond heterogeneously branched polyethylene, carded hPP, or various bicomponent polypropylene structures.

End Uses

The films or ultrasonically bonded laminates described herein may be used in a variety of applications. In some embodiments, the films or laminates can be used in hygiene applications, such as diapers, training pants, and adult incontinence articles, or in other similar absorbent garment applications. In other embodiments, the films or laminates can be used in medical applications, such as medical drapes, gowns, and surgical suits, or in other similar fabric (woven or nonwoven) applications. The films or laminates may be non-breathable.

Test Methods

Unless otherwise stated, the following test methods are used. All test methods are current as of the filing date of this disclosure.

Density

Density can be measured in accordance with ASTM D-792.

Melt Index

Melt index ($I_2$) can be measured in accordance with ASTM D-1238, Procedure B (condition 190° C./2.16 kg). Melt index ($I_{10}$) can be measured in accordance with ASTM D-1238, Procedure B (condition 190° C./10.0 kg).

Melt Flow Rate

Melt Flow Rate, or MFR, for propylene-based polymers is measured in accordance with ASTM D1238 at 230° C., 2.16 kg.

Gel Permeation Chromatography (GPC)

The chromatographic system consisted of a PolymerChar GPC-IR (Valencia, Spain) high temperature GPC chromatograph equipped with an internal IR5 detector. The autosampler oven compartment was set at 160° Celsius and the column compartment was set at 150° Celsius. The columns used were 3 Agilent "Mixed B" 30 cm 10-micron linear mixed-bed columns and a 10-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad (EQ1)$$

where M is the molecular weight, A has a value of 0.4315 and B is equal to 1.0.

A fifth order polynomial was used to fit the respective polyethylene-equivalent calibration points. A small adjustment to A (from approximately 0.415 to 0.44) was made to correct for column resolution and band-broadening effects such that NIST standard NBS 1475 is obtained at 52,000 Mw.

The total plate count of the GPC column set was performed with Eicosane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{RV_{Peak\ Max}}{\text{Peak Width at } \frac{1}{2} \text{ height}} \right)^2 \quad (EQ\ 2)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ\ 3)$$

where RV is the retention volume in milliliters and the peak width is in milliliters, Peak max is the maximum position of the peak, one tenth height is ⅒ height of the peak maximum, rear peak refers to the peak tail at later retention volumes than the peak max, and front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of Mn, Mw, and Mz were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$M_n = \frac{\sum_i IR_i}{\sum_i \left( \frac{IR_i}{M_{polyethylene_i}} \right)} \quad (EQ\ 4)$$

$$M_w = \frac{\sum_i (IR_i * M_{polyethylene_i})}{\sum_i IR_i} \quad (EQ\ 5)$$

$$M_z = \frac{\sum_i (IR_i * M_{polyethylene_i}^2)}{\sum_i (IR_i * M_{polyethylene_i})} \quad (EQ\ 6)$$

In order to monitor the deviations over time, a flowrate marker (decane) was introduced into each sample via a micropump controlled with the PolymerChar GPC-IR system. This flowrate marker was used to linearly correct the flowrate for each sample by alignment of the respective decane peak within the sample to that of the decane peak within the narrow standards calibration. Any changes in the time of the decane marker peak are then assumed to be related to a linear shift in both flowrate and chromatographic slope. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (as a measurement of the calibration slope) is calculated as Equation 7. Processing of the flow marker peak was done via the PolymerChar GPCOne™ Software.

$$Flowrate_{effective} = Flowrate_{nominal} \times \frac{FlowMarker_{Calibration}}{FlowMarker_{Observed}} \quad (EQ\ 7)$$

Melt Strength

Melt strength may be measured at 190° C. using a Göettfert Rheotens 71.97 (Göettfert Inc.; Rock Hill, S.C.), melt fed with a Göettfert Rheotester 2000 capillary rheometer equipped with a flat entrance angle (180 degrees) of length of 30 mm and diameter of 2.0 mm. The pellets (20-30 gram pellets) are fed into the barrel (length=300 mm, diameter=12 mm), compressed and allowed to melt for 10 minutes before being extruded at a constant piston speed of 0.265 mm/s, which corresponds to a wall shear rate of 38.2 $s^{-1}$ at the given die diameter. The extrudate passes through the wheels of the Rheotens located 100 mm below the die exit and is pulled by the wheels downward at an acceleration rate of 2.4 mm/$s^2$. The force (in cN) exerted on the wheels is recorded as a function of the velocity of the wheels (in mm/s). Melt strength is reported as the plateau force (cN) before the strand broke.

2% Secant Modulus/Stress at Break

Tensile properties, including the secant modulus at 2% strain and the stress at break, are determined in the machine and cross directions according to ASTM D882.

Spencer Dart Impact Strength

The Spencer dart impact strength test is determined according to ASTM D3420, Procedure B.

Puncture Resistance

Puncture is measured on a tensile testing machine according to ASTM D5748, except for the following: square specimens are cut from a sheet to a size of 6 inches by 6 inches; the specimen is clamped in a 4 inch diameter circular specimen holder and a puncture probe is pushed into the center of the clamped film at a cross head speed of 10 inches/minute; the probe is a 0.5 inch diameter polished steel ball on a 0.25 inch support rod; there is a 7.7 inch maximum travel length to prevent damage to the test fixture; there is no gauge length—prior to testing, the probe is as close as possible to, but not touching, the specimen. A single thickness measurement is made in the center of the specimen. A total of five specimens are tested to determine an average puncture value.

Noise

Noise tester equipment includes an acoustic isolated box that contains a microphone MK 221 used to capture sound and a NC 10 Audio Acoustic Analyzer by Neutrix Cortex Instruments. The microphone is sensitive to a signal having a Frequency (Hz) of 20 Hz-20,000 Hz. The microphone is located in the center of the acoustic box at 10 cm horizontally aligned with the film surface and 25 cm vertically aligned with the box top. The acoustic isolated box is made of lead with dimensions of 53 cm×53 cm×53 cm. Films are cut to a specimen size of 10 cm×10 cm. The specimen is fixed to two holders, a first holder that is stationary and a second holder that is movable to provide a flexing motion of the film. The equipment is run in vacuum to obtain ground-noise readings that are subtracted from noise readings generated by each specimen. The data is collected on the ⅓ octave. Four different specimens are measured per film.

Softness

The "softness" or "hand" quality is considered to be the combination of resistance due to surface friction, flexibility, and compressibility of a fabric material. A Handle-O-Meter tester (manufactured by Thwing-Albert Instrument Co., West Berlin, N.J.) measures the above factors using a Linear Variable Differential Transformer (LVDT) to detect the resistance that a blade encounters when forcing a specimen of material into a slot of parallel edges. Samples are cut into 8 in×8 in square specimens. The Handle-O-Meter slot width is set at 20 mm Measurements are taken in each of four positions per specimen as required by the instrument manufacturer's test manual, and the four measurements are summed to give the total hand for a single specimen in grams-force. This averaged hand is then normalized to the specimen weight and volume. Samples having a lower resistance value are considered to have better softness.

Examples

The embodiments described herein may be further illustrated by the following non-limiting examples.

Three layer films were made as outlined below. The films were produced on a three layer commercial cast line having a maximum line speed of 200 m/min, a melt temperature of 260° C., a die temp of 260° C., a die gap of 0.8 mils, and an air gap of 9 in. The multilayer films have a basis weight of 14 gsm. The core layer comprises 70% of the overall film thickness. Each skin layer comprises 15% of the overall film thickness.

Preparation of Inventive Film

The Inventive Example used the following resins: a low density polyethylene (LDPE) is a high pressure low density polyethylene made in an autoclave reactor having a density of 0.918 g/cc and a melt index of 8.0 g/10 min (LDPE 722, available from The Dow Chemical Company, USA); an isotactic polypropylene homopolymer having a density of 0.900 g/cc and a melt flow rate of 22 g/10 min (Polypropylene 6231, available from LyondellBasell Industries, USA); a propylene-based elastomer or plastomer having a density of 0.863 g/cc and a melt flow rate of 8 g/10 min (VERSIFY™ 3401, available from The Dow Chemical Company, USA); and a high density polyethylene having a density of 0.947 g/cc and a melt index of 6.0 g/10 min (AGILITY™ 6047G, available from The Dow Chemical Company, USA). The high density polyethylene was further characterized below in Tables 1 & 2.

| Inventive Example | Skin (wt. %) | Core (wt. %) | Skin (wt. %) |
|---|---|---|---|
| LDPE | 20 | 15 | 20 |
| Polypropylene | 50 | 0 | 50 |
| Propylene-based Elastomer or Plastomer | 30 | 0 | 30 |
| HDPE | 0 | 85 | 0 |

Preparation of Comparative Films

Comparative Example 1 is an isotactic polypropylene homopolymer having a density of 0.900 g/cc and a melt flow rate of 22 g/10 min (Polypropylene 6231, available from LyondellBasell Industries, USA).

| Comparative Example 1 | Skin (wt. %) | Core (wt. %) | Skin (wt. %) |
|---|---|---|---|
| Polypropylene | 100 | 100 | 100 |

Comparative Example 2 is an isotactic polypropylene homopolymer having a density of 0.900 g/cc and a melt flow rate of 22 g/10 min (Polypropylene 6231, available from LyondellBasell Industries, USA) and a high pressure low density polyethylene made in an autoclave reactor having a density of 0.918 g/cc and a melt index of 8.0 g/10 min (LDPE 722, available from The Dow Chemical Company, USA).

| Comparative Example 2 | Skin (wt. %) | Core (wt. %) | Skin (wt. %) |
|---|---|---|---|
| LDPE | 15 | 15 | 15 |
| Polypropylene | 85 | 85 | 85 |

Comparative Example 3 is a high pressure low density polyethylene made in an autoclave reactor having a density of 0.918 g/cc and a melt index of 8.0 g/10 min (LDPE 722, available from The Dow Chemical Company, USA), and a high density polyethylene (HDPE) having a density of 0.947 g/cc and a melt index of 6.0 g/10 min (AGILITY™ 6047G, available from The Dow Chemical Company, USA).

| Comparative Example 3 | Skin (wt. %) | Core (wt. %) | Skin (wt. %) |
|---|---|---|---|
| LDPE | 15 | 15 | 15 |
| HDPE | 85 | 85 | 85 |

Comparative Example 4 is a high pressure low density polyethylene made in an autoclave reactor having a density of 0.918 g/cc and a melt index of 8.0 g/10 min (LDPE 722, available from The Dow Chemical Company, USA); an ethylene-based polymer that is an ethylene-octene copolymer having a density of 0.916 g/cc and a melt index of 4.0 g/10 min (ELITE™ 5230G, available from The Dow Chemical Company, USA); and a high density polyethylene (HDPE) having a density of 0.947 g/cc and a melt index of 6.0 g/10 min (AGILITY™ 6047G from The Dow Chemical Company, USA).

| Comparative Example 4 | Skin (wt. %) | Core (wt. %) | Skin (wt. %) |
|---|---|---|---|
| LDPE | 15 | 15 | 15 |
| HDPE | 65 | 65 | 65 |
| Ethylene-based polymer | 25 | 25 | 25 |

Preparation of Laminates

The inventive and comparative films are point bonded using ultrasonic bonding to a spunbond polypropylene nonwoven having a basis weight of 14 gsm. About 9% of the area is bonded. The line speed was 200 m/min, the welding force was 700-1150 N, and the frequency was 90%.

Results

TABLE 1

Measured Melt Index and Density Data

| Type | $I_2$, g/10 min | $I_{10}/I_2$ | Density (g/cc) |
|---|---|---|---|
| HDPE | 5.85 | 6.84 | 0.947 |

TABLE 2

Conventional GPC Data

| Type | Mn (g/mol) | Mw (g/mol) | Mz (g/mol) | Mw/Mn |
|---|---|---|---|---|
| HDPE | 24,284 | 77,492 | 237,728 | 3.19 |

TABLE 3

Film Results

| | Comparative film 1 | Comparative film 2 | Comparative film 3 | Comparative film 4 | Inventive example |
|---|---|---|---|---|---|
| Noise Intensity, dB (Freq. Range 20-20,000 Hz) | 32.47 | 28.21 | 22.07 | 5.72 | 0 |
| Softness, g | 4.55 | 3.25 | 2.10 | 2.20 | 2.40 |
| Puncture resistance, ft * $lb_f/in^3$ | 5.36 | 4.93 | 6.21 | 13.17 | 15.40 |
| Spencer Dart Impact, g | 68.39 | 72.40 | 94.00 | 117.20 | 153.9 |
| 2% Secant Modulus CD, psi | 36809.88 | 29941.67 | 24753.83 | 16576.68 | 24423.27 |
| 2% Secant Modulus MD, psi | 38424.96 | 27860.48 | 24348.85 | 19160.56 | 23737.28 |
| Load @ Break CD, psi | 1674.91 | 710.59 | 1601.55 | 1810.21 | 2024.58 |
| Load @ Break MD, psi | 1675.55 | 1428.90 | 1682.73 | 2162.15 | 1919.29 |

2% Secant Modulus Results

The 2% secant modulus (psi) was measured in the machine direction (MD) and cross direction (CD) for the inventive example and the comparative example films. The results are shown in Table 3. Referring to FIG. 1, the 2% secant modulus of the inventive example is lower than the 2% secant modulus of the comparative examples 1 and 2, which comprise greater amounts of polypropylene. In comparison to comparative examples 3 and 4, the 2% secant modulus of the inventive example has similar values showing that there is no significant adverse effect to the 2% secant modulus in the inventive example. Further, the 2% secant modulus of the inventive example achieved suitable levels, having values above a desired level of 16,000 psi.

Stress at Break Results

Figure 2:
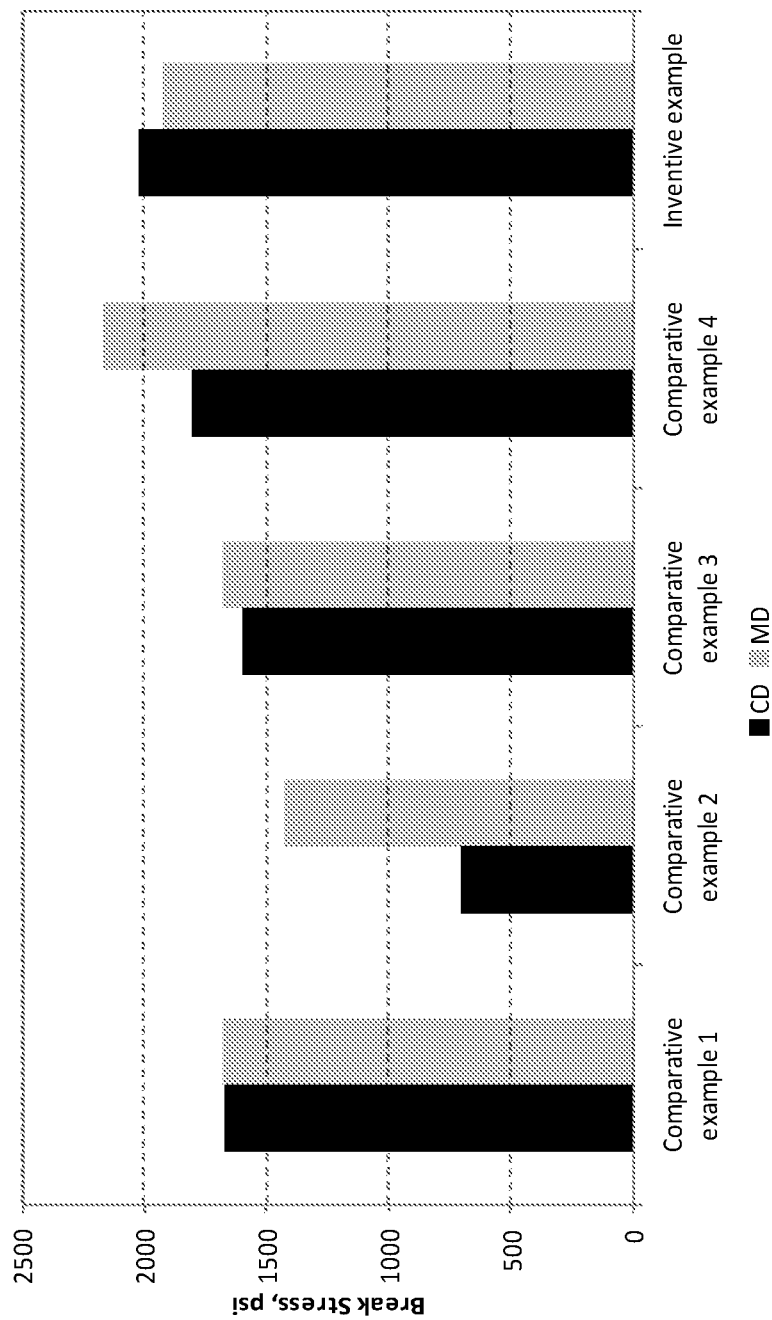
FIG. 2 graphically depicts the load at break (i.e., stress at break) for a multilayer film according to one or more embodiments shown or described herein in comparison to several comparative films.

The stress or load at break (psi) was measured in the machine direction (MD) and cross direction (CD) for the inventive example and the comparative example films. The results are shown in Table 3. Referring to FIG. 2, the inventive example has a higher stress at break, which can indicate increased film strength in comparison to the comparative examples.

Spencer Dart Impact Strength Results

Figure 3:
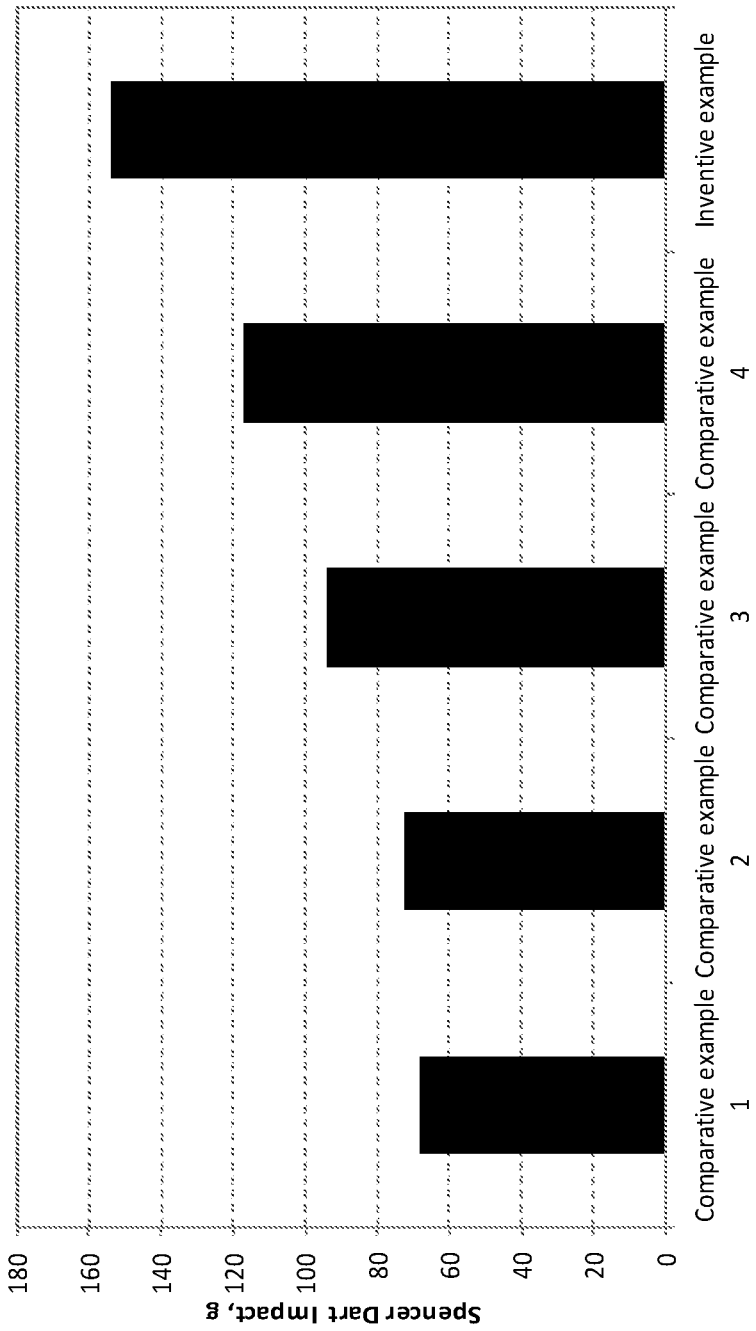
FIG. 3 graphically depicts the spencer dart impact for a multilayer film according to one or more embodiments shown or described herein in comparison to several comparative films.

The spencer dart impact strength (g) was measured for the inventive example and the comparative example films. The results are shown in Table 3. Referring to FIG. 3, the inventive example has a higher dart impact strength, which can indicate increased biaxial film strength in comparison to the comparative examples.

Puncture Resistance Results

Figure 4:
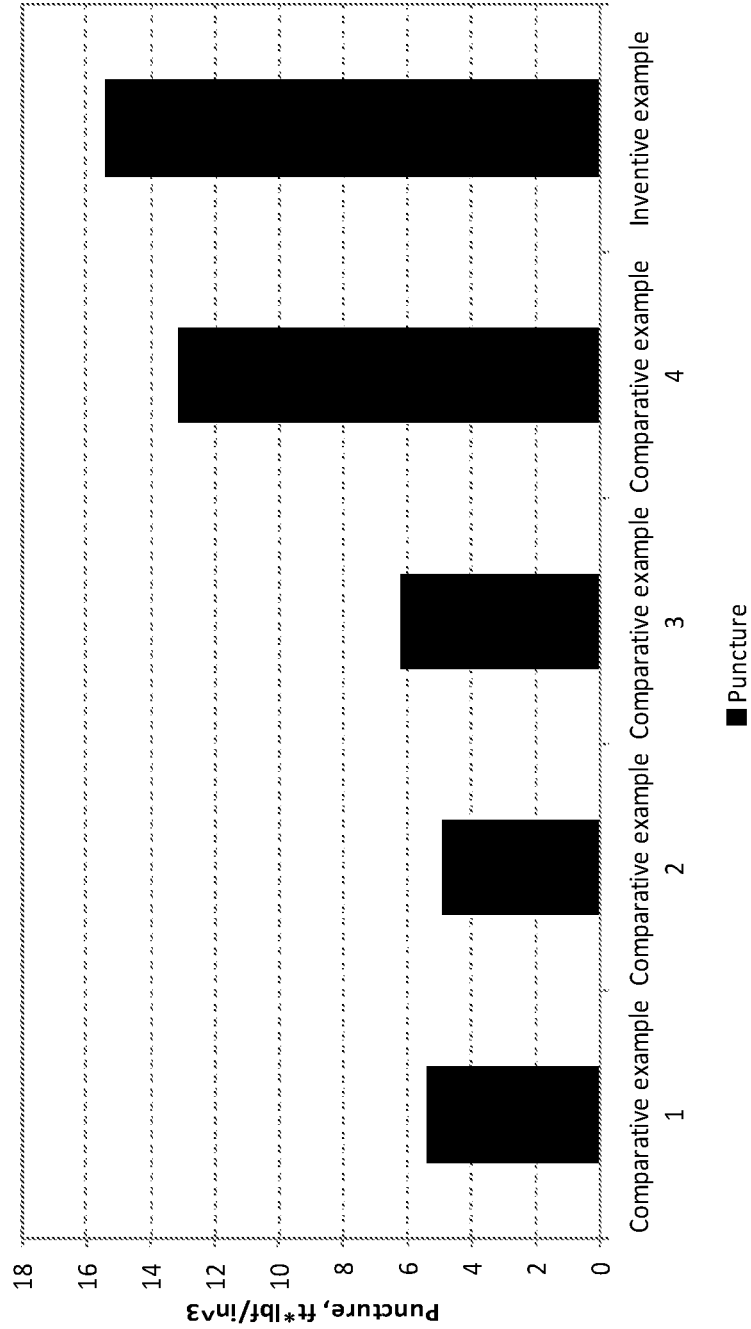
FIG. 4 graphically depicts the puncture resistance for a multilayer film according to one or more embodiments shown or described herein in comparison to several comparative films.

The puncture resistance (ft·lb$_f$/in$^3$) was measured for the inventive example and the comparative example films. The results are shown in Table 3. Referring to FIG. 4, the inventive example has a higher puncture resistance, which can also indicate increased biaxial film strength in comparison to the comparative examples.

Noise Results

Figure 5:
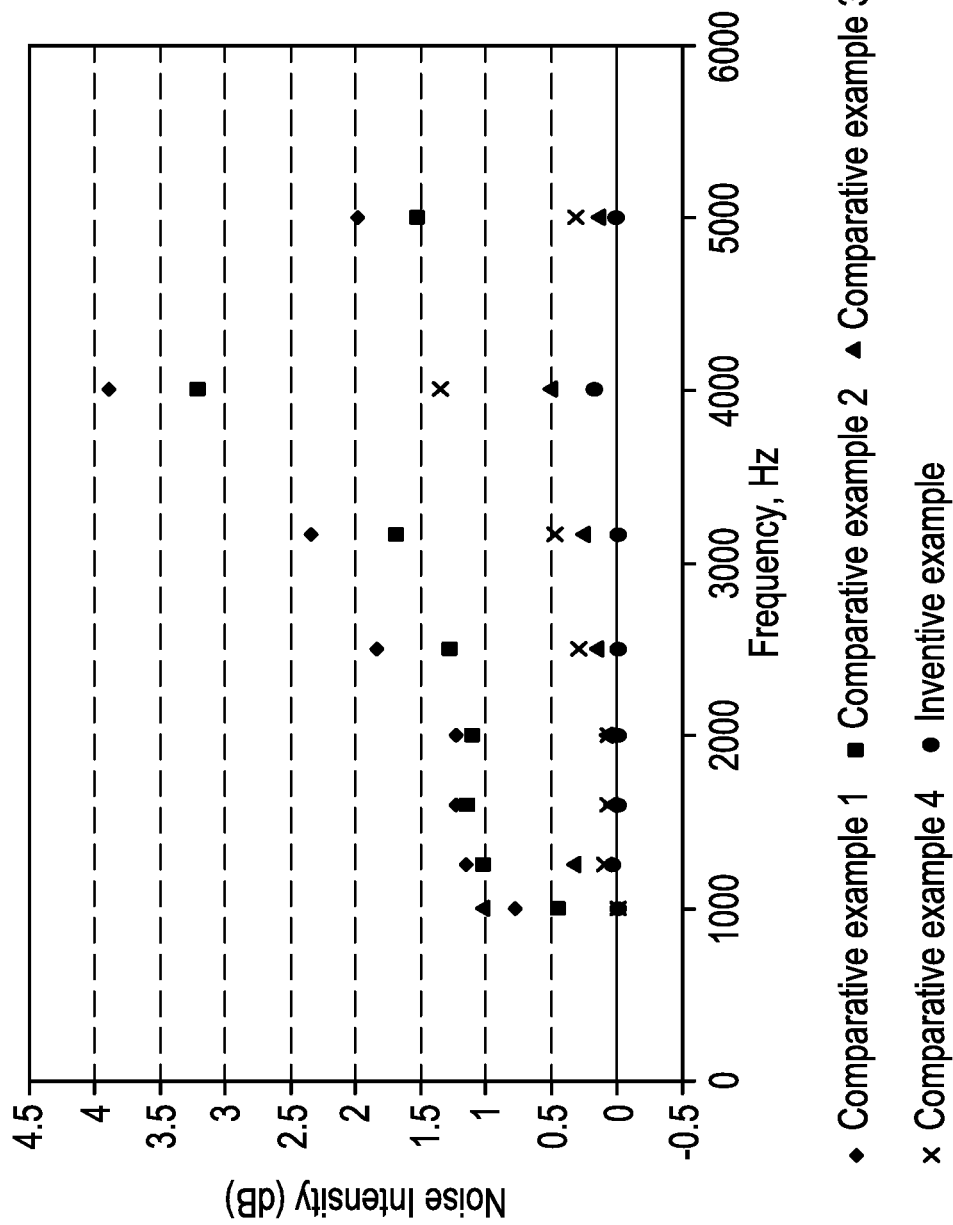
FIG. 5 graphically depicts the noise intensity for a multilayer film according to one or more embodiments shown or described herein in comparison to several comparative films.

The noise (dB) was measured for the inventive example and the comparative example films between a frequency band of 20 Hz-20,000 Hz. The results over the entire frequency band of 20 Hz-20,000 Hz are shown in Table 3. Referring to FIG. 5, the noise between a frequency band of 1,000-5,000 Hz, which corresponds to the frequency band where a human ear is most sensitive to noise, is shown for the inventive example and the comparative examples. As depicted, the inventive example has lower noise values than the comparative films.

Softness Results

Figure 6:
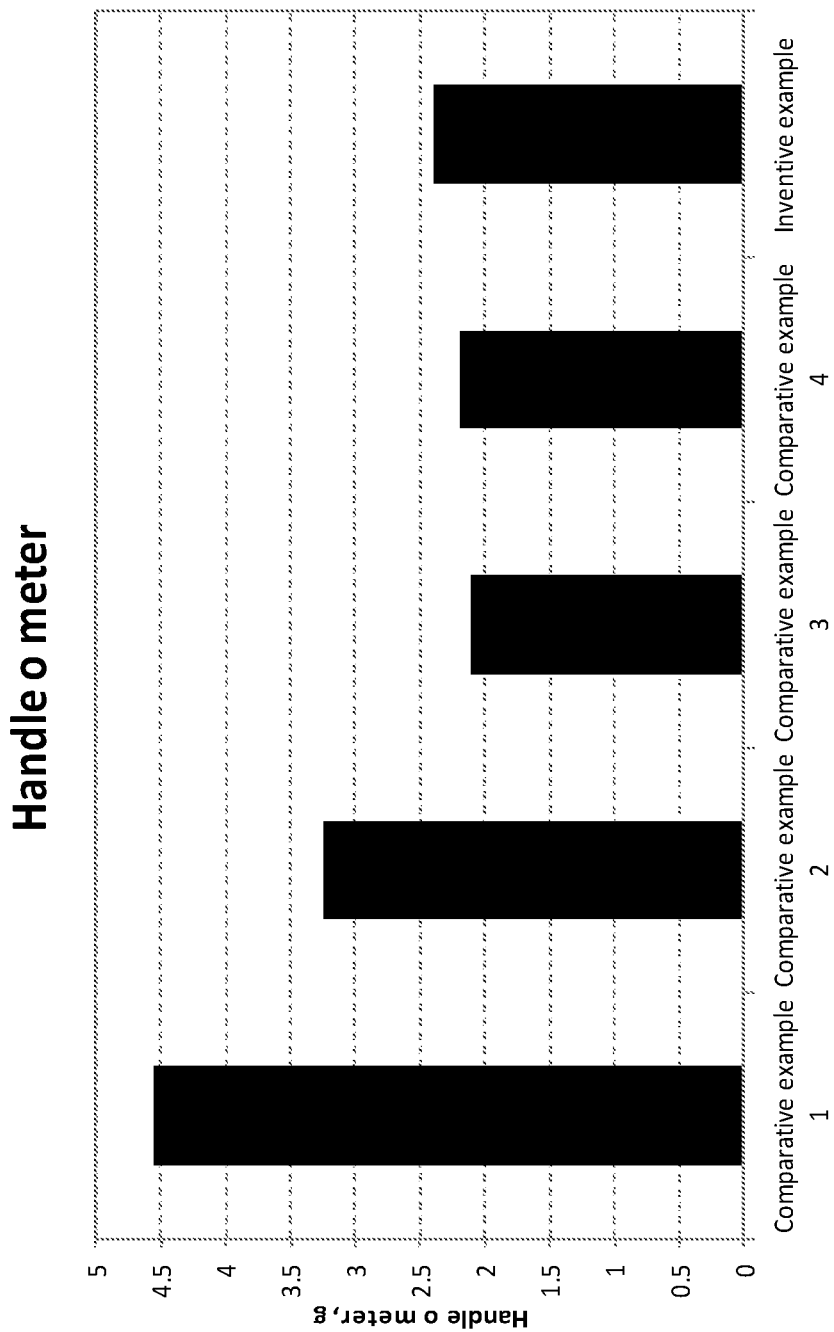
FIG. 6 graphically depicts the softness for a multilayer film according to one or more embodiments shown or described herein in comparison to several comparative films.

The softness (g) was measured for the inventive example and the comparative example films. The results are shown in Table 3. Referring to FIG. 6, the inventive example has a lower softness value, which can indicate a better softness result, than comparative examples 1 and 2, which use polypropylene. Also, the inventive example achieves suitable levels of softness as shown in comparison to comparative films 3 and 4. There is no significant adverse effect to softness in the inventive example.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A multilayer film comprising:
    a core layer and two skin layers;
    wherein the core layer is positioned between the two skin layers;
    wherein the core layer comprises a polyethylene composition comprising a high density polyethylene having a density of 0.930-0.955 g/cc and a melt index of 0.7-10.0 g/10 min and from 5 to 15%, by weight of the polyethylene composition, a low density polyethylene having a density of about 0.915-0.935 g/cc and a melt index of 0.2-15 g/10 min, wherein the polyethylene composition has an overall density of about 0.940-0.955 g/cc; and
    wherein each skin layer independently comprises a polypropylene composition comprising greater than 50 wt. %, based on the total weight of the polypropylene composition, of a propylene-based polymer and from 5 wt. % to 30 wt. % of a low density polyethylene, wherein the propylene-based polymer is a combination of a polypropylene homopolymer and a propylene-based elastomer or plastomer.

2. The film of claim 1, wherein the polyethylene composition has a a melt index of about 1.0-8.0 g/10 min.

3. The film of claim 1, wherein the core layer comprises from about 50% to about 85% of the overall film thickness.

4. The film of claim 1, wherein the two skin layers have an equal thickness.

5. The film of claim 1, wherein the film exhibits at least one of the following properties:
    a spencer dart impact strength of greater than 140 g;
    a 2% secant modulus of greater than about 20,000 psi in the machine direction and greater than 20,000 psi in the cross direction;
    a stress at break in the cross-direction of greater than about 1,800 psi, and in the machine direction of greater than about 1,700 psi; or
    a puncture resistance greater than about 13 ft·lb$_f$/in$^3$.

6. The film of claim 1, wherein the film exhibits at least one of the following properties:
    a softness value difference of less than 15%, when compared to a 100% polyethylene film having a 2% secant modulus of greater than about 16,000 psi in the machine direction; or
    a noise value of less than 0.5 dB between a frequency band of 1,000 Hz and 5,000 Hz.

7. The film of claim 1, wherein the film has a basis weight of between about 8-30 gsm.

8. An ultrasonically bonded laminate comprising:
the multilayer film according to claim 1; and
a nonwoven substrate at least partially ultrasonically bonded to the multilayer film to form a laminate.

* * * * *